United States Patent [19]

Hart et al.

[11] Patent Number: 4,716,409
[45] Date of Patent: Dec. 29, 1987

[54] ELECTRICAL APPLIANCE CONTROL SYSTEM

[75] Inventors: Edward F. Hart, Yorba Linda; William McDonough, El Toro, both of Calif.

[73] Assignee: Homestead Products, Inc., Ramona, Calif.

[21] Appl. No.: 886,249

[22] Filed: Jul. 16, 1986

[51] Int. Cl.⁴ .................... G05B 19/02; H04M 11/04
[52] U.S. Cl. .......................... 340/825.22; 340/310 A; 340/310 R; 98/40.05
[58] Field of Search .......... 340/310 A, 310 R, 825.22, 340/384 E, 825.69; 307/41, 252 B; 98/40.05, 40.07; 417/572

[56] References Cited

U.S. PATENT DOCUMENTS

| | | | |
|---|---|---|---|
| 3,896,355 | 7/1975 | Guicheteau | 318/207 |
| 4,155,015 | 5/1979 | Nakasone et al. | 307/252 B |
| 4,322,632 | 3/1982 | Hart et al. | 307/41 |
| 4,329,678 | 5/1982 | Hatfield | 340/310 A |
| 4,350,903 | 9/1982 | Jimerson et al. | 307/252 B |
| 4,367,455 | 1/1983 | Fried | 340/310 A |
| 4,382,400 | 5/1983 | Stutzman | 98/40.07 |
| 4,386,340 | 5/1983 | Satoh | 340/384 E |
| 4,418,333 | 11/1983 | Schwarzbach et al. | 340/310 A |
| 4,538,973 | 9/1985 | Angott et al. | 417/572 |
| 4,559,520 | 12/1985 | Johnston | 340/310 R |
| 4,611,274 | 9/1986 | Machino et al. | 340/310 R |
| 4,612,594 | 9/1986 | Yamaura et al. | 340/310 R |
| 4,644,320 | 2/1987 | Carr et al. | 340/310 A |

OTHER PUBLICATIONS

Casablanca Fan Company Catalog, 1984.

*Primary Examiner*—Douglas W. Olms
*Assistant Examiner*—Curtis Kuntz
*Attorney, Agent, or Firm*—Brown, Martin, Haller & Meador

[57] ABSTRACT

A control system for operating at least two electrical appliances, such as a combination ceiling fan and light assembly, from a remotely located multi-position manually operated switch assembly. The system responds to a series of different control signals actuated by the different switch positions to switch either one of the appliances on or off, to control the intensity of the light or the speed of the fan, or to initiate any one of a series of pre-programmed sequences of operations of the appliances.

30 Claims, 17 Drawing Figures

ELECTRICAL APPLIANCE CONTROL SYSTEM

BACKGROUND OF THE INVENTION

The present invention relates generally to a remote control system for controlling operation of two or more electrical appliances, and is particularly concerned with the control of a combination ceiling fan and light assembly.

It is common, particularly in relatively hot climates, for some or all of the rooms of a building to have the normal ceiling light fixture replaced with a combination ceiling fan and light assembly. During daylight hours the fan may be operated alone, while at night the light may be operated alone or in combination with the fan.

There are a number of problems associated with installation and control of a combination ceiling fan and light assembly, which prior art systems have attempted to overcome. The conventional house lighting circuit is a two wire circuit, and considerable expense is involved if any modification to this circuit is required for installation of a combination fan and light. If modification to the circuit is to be avoided, the fan and light control must be installable either at the location of the wall light switch or at the overhead ceiling fan and light fixture. The control must also allow the fan and light to be operated separately, since the light will not be needed in daylight, for example. This means that the conventional two way light switch must be modified. The control should also preferably allow for different fan speeds, and possibly also different light intensities. Another requirement for the control is that it must not exceed a predetermined maximum power dissipation, and that the AC waveform arrive at the fan motor essentially undistorted to ensure relatively silent motor operation.

One approach to these problems in the past has been to provide several pull chain switches on the fan and light fixture itself to switch the power to the two devices on and off independently. However, since ceiling fans and lights are often installed on high ceilings and/or over furniture, access to the pull chain controls may be difficult or even hazardous. This control system is also awkward to operate and creates many situations where it is necessary to enter a room in darkness and attempt to find the correct pull chain to turn on the light.

Other approaches have involved modification of the standard wall located light switch. It is possible to control the fan and light separately from a wall location by rewiring the household circuit to run approximately six wires from the wall switch location to the ceiling outlet, but this is clearly undesirable because of the expense involved.

It is therefore desirable to control the fan and light operation, fan speed and light intensity separately and independently using the existing household wiring from a wall switch location. This is made difficult because only one side of the circuit is usually available at the wall location. Thus there is effectively no power available to operate a signalling device such as a radio transmitter, for example. It is difficult to provide the desired flexibility of independent operations from a single wall control switch, as can be seen from the prior art systems of this type.

One prior control system for selectively applying power to one or more of a group of devices, such as a ceiling fan and light, is described in U.S. Pat. No. 4,322,632 of Hart et al, in which the loads are selectively switched on in response to predetermined sequences of operations of the wall switch. Thus, the first load is switched on in response to a single switch closure, both loads are activated simultaneously by a successive switch closure, and a third switch closure activates the second load only. The repeated toggling of the switch is detected by transition detecting circuitry to operate the selected device. This involves complete interruption of power to the devices during signalling, which is undesirable. This sequence of switch operations is also clumsy and difficult to remember, and does not provide much flexibility in adding additional operations such as fan direction and speed controls and light intensity controls.

In U.S. Pat. No. 4,329,678 a different type of control system is shown in which control signals are generated which comprise delayed pulses superimposed on the AC power signal. Each electrical appliance is associated with a receiver which is responsive only to pulses having a predetermined phase value. By closing the appropriate switch of a multi-position switching assembly, a pulse having a predetermined phase value is produced which is detected by one or more of the receivers to operate the associated appliance. In this system both the control signal transmitters and the receivers are connected in parallel across the household power lines, requiring significant rewiring. Each appliance requires its own separate transmitter and receiver with a selected predetermined phase value for operation, significantly adding to the expense and complexity of the circuit. The circuit does not allow for different types of operation of a single appliance, nor does it allow two appliances to be operated either simultaneously or separately.

Another known ceiling fan and light control system is manufactured by Casablanca Fan Company under the name Inteli-Touch. This system is the subject of U.S. patent application Ser. No. 607,952 of Hart, filed May 7, 1984, and assigned to the Casablanca Fan Corp. In this system independent control of the fan and lights is provided without having to alter the wiring of a conventional home lighting circuit.

In the Casablanca system, two wall switches are used to operate the fan alone, the light alone, and the fan plus the light, in response to closure of either one or both of the two wall switches. Signals produced by closure of the switches comprise delayed pulses on the positive and negative going halves of each AC cycle, respectively, and pulses on both halves of the cycle. Detection circuitry detects the analog voltage level at a predetermined time interval after a zero crossing of the signal to determine whether a timing delay is present, and produces a control signal for operating a microprocessor when a delay is detected. This system therefore cannot tolerate phase shifting and is sensitive to line voltage variations.

In the Casablanca system special programs can be selected by operating the three switches in a specified sequence, with the resultant signal sequence detected by suitable circuitry to operate a microcomputer pre-programmed to initiate a predetermined sequence of events. This multiple switch operation must be completed within a predetermined time interval, i.e. within the first seven seconds after the power is turned on, and is difficult for the operator to remember without consulting product literature. Thus, for example, a security program to turn house lights on and off while no-one is at home is initiated by operating the light and fan switches in the following sequence: light, fan, light, fan. This is clearly relatively awkward and does not allow much potential for future additional programs to be added.

SUMMARY OF THE INVENTION

It is an object of the present invention to provide a versatile and easy to operate ceiling fan and light control system.

According to the present invention a control system for operating two electrical appliances such as a ceiling fan and light independently from a remote wall control is provided. The system comprises a series of manually operable switches and a firing delay generating circuit responsive to operation of the switches to generate a series of different control signals, each control signal being generated by actuation of a predetermined one of the switches and comprising a predetermined dalay in the AC sine wave after a predetermined polarity zero crossing of the wave. A detection circuit senses the delay in each half of the AC sine wave by sensing the length of the half wave and producing an output control pulse of equivalent length. Polarity sensing means is provided to sense the polarity of the delayed half wave and produce a polarity control signal. The polarity control signal and control pulse of the detection circuit are used to control a microprocessor pre-programmed to associate each delayed signal of each polarity with a predetermined control function, the control functions including switching on and off of the appliances and pre-programmed on/off sequences of operation of one or both appliances.

In the preferred embodiment of the invention the delay in the AC sine wave is produced by a switching device which turns the main current on and off, and which is fired to turn on the current after a positive or negative going zero crossing after a predetermined time interval determined by which of the series of switches is closed. If none of the switches are closed, the switching device is fired an instant after the voltage passes through zero. The switches include a first set for controlling firing of a first switching device after positive going zero crossings, and a second set for controlling firing of a second switching device after negative going zero crossings. Preferably three switches are provided in each set, corresponding to three different time delays and thus three different phase delays in the output AC waveform. These may suitably comprise 30 degree, 45 degree and 60 degree phase firing delays in the positive and negative halves of the waveform, for example. Thus six different control signals are available, each by depression or actuatiion of a single switch.

In the preferred arrangement, the microprocessor is programmed to switch the light on and off in response to detection of control pulses corresponding to 30 degree phase firing delays on the positive and negative halves of the AC wave, respectively, and to switch the fan on and off in response to detection of 45 degree phase firing delays on the positive and negative halves of the AC wave, respectively. The microprocessor program requires any phase firing delay signal to be present for a predetermined number of cycles before executing commands corresponding to that firing delay signal. This is to avoid invalid command signals as a result of temporary power interruptions, for example. Preferably, control signals for increasing and decreasing the light intensity, and for increasing and decreasing the fan speed, are provided by the corresponding firing delay signals being present for greater than a predetermined time interval. Thus, for example, if the firing delay signal which normally causes the microprocessor to switch on the light is present for more than the predetermined minimum number of cycles of the AC signal, the light intensity will ramp upwards until the signal ceases. Similarly, a lights off signal present for greater than the predetermined number of cycles will ramp the light intensity downwards. Similar extended firing delay signals for the fan will ramp the fan speed up and down, respectively. These controls are produced by the operator depressing or closing the corresponding switch for greater than a predetermined time interval, and are preferably announced by an audio signal so that the operator knows that the desired command is being carried out by the system.

Preferably, the 60 degree firing delay is associated with a series of programmed sequences of events, the sequence initiated by the microprocessor being dependent on the duration of the firing delayed signal. These sequences of events may include, for example, a programmed security sequence to switch the lights on and off at different intervals while the home owner is out, a power saving sequence to turn lights off automatically after a predetermined time interval, and/or a fan speed reduction program in which fan speed is automatically reduced with time to approximate the reduced need for cooling that would be encountered during the night, for example.

With the control system of this invention, therefore, the operator is not required to enter any complex, multi-key codes to initiate a desired operation but can initiate six different control functions in response to actuation of any one of six switches, and can initiate further options simply by holding down a depressed switch for an extended period. Except during signalling, the control system passes an essentially pure sine wave to the fan motor, assuring quiet operation.

BRIEF DESCRIPTION OF THE DRAWINGS

The present invention will be better understood from the following detailed description of a preferred embodiment of the invention, taken in conjunction with the accompanying drawings in which like reference numerals refer to like parts and in which.

DESCRIPTION OF THE PREFERRED EMBODIMENT

Figure 1:
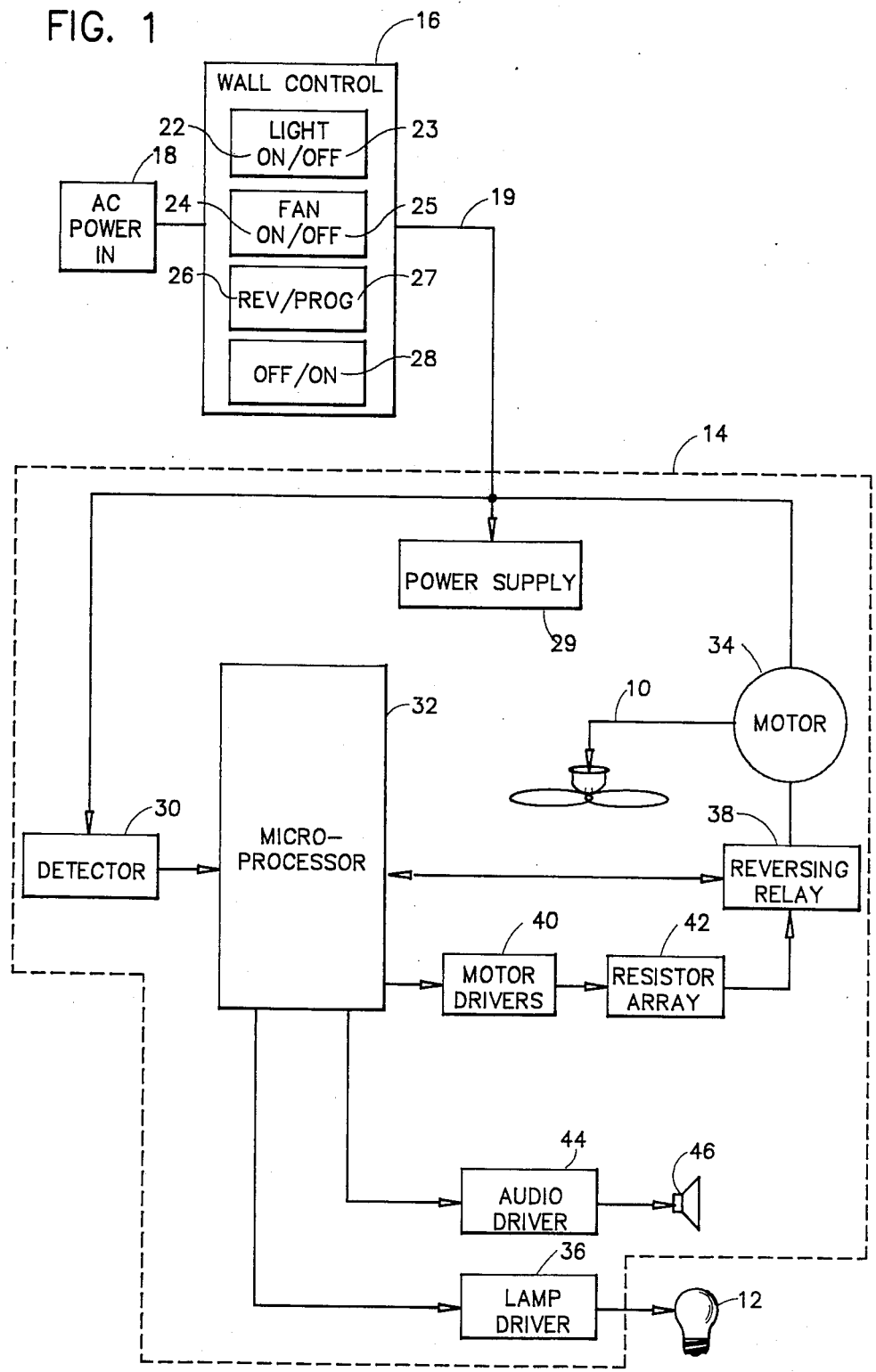
FIG. 1 is a block diagram of a ceiling fan and light control system according to a preferred embodiment of the present invention.

The drawings illustrate a preferred embodiment of an electrical appliance control system according to the present invention. The system in the preferred embodiment, as illustrated generally in FIG. 1, is designed to control a combination ceiling fan 10 and light 12, generally provided in a combined ceiling fixture (not shown) to replace the standard ceiling light fixture, by means of a main control unit 14 operated from a remote wall control switching unit 16 which replaces the standard lighting fixture on/off switch and which is connected on one side of the standard household AC power line from a 120 Volt AC mains power supply input generally indicated at 18. Although in the preferred embodiment the system controls a ceiling fan and light combination, it could clearly be arranged to operate other types of electrical appliances in a similar manner in alternative embodiments, and more than two appliances could be controlled at the same time if desired. The wall control unit 16 provides output control signals on output line 19 for detection by the main control unit 14 which controls operation the ceiling fan and light assembly.

The main control unit 14 is suitably provided in a housing (not shown) at the overhead ceiling fan/light fixture. The wall control unit 16 comprises a signalling or signal generating circuit shown in more detail in FIG. 2 which has several normally open switches which are controlled from an external wall control panel having a series of manually operable push keys or devices to allow the operator to choose from a variety of different operations. The preferred arrangement of the control keys is illustrated in FIG. 1, and preferably comprises a series of two-way toggle keys or devices including on/off light control keys 22, 23; on/off fan control keys 24, 25 and reverse/program control keys 26, 27, the use of which is described in more detail below in connection with FIG. 6. Also included on the wall panel is an on/off power switch or button 28.

The wall control unit is designed to transmit a variety of different control signals to the main control unit 16 in response to actuation of the various keys on the control panel, one distinctive control signal being produced by actuation of each key. The various components of the main control unit are powered by internal power supply 29 and include a detector assembly 30 for detecting the various control signals, and a microprocessor or microcomputer 32 operated in response to command signals from the detector assembly to control operation of a fan motor 34 and a lamp driver 36 connected to the fan 10 and light 12, respectively. The microprocessor operates in response to stored program instructions associated with the various control signals, as described in more detail below, and is connected to the motor 34 through a motor driver 40 and resistor array 42 for controlling the speed of the fan. The microprocessor is also connected to a reversing relay 38 for controlling the direction of the motor, and thus the fan direction. The microprocessor is also connected to an audio driver 44 and speaker 46 for transmitting audio signals to the user as described below.

All the components of the main control unit described above may be suitably mounted on a printed circuit board housed in the fan motor housing (not shown).

The wall control unit 16 will now be described in more detail with reference to FIG. 2. It is connected in series with the electrical appliance or load in the same manner as a conventional light switch. The unit is in two parts, one part of the positive phase of the AC waveform and one part for the negative phase of the AC waveform. Each part of the circuit basically comprises a switching assembly which actually turns the main AC current on and off for a predetermined time interval according to which of the manual control keys is actuated.

The switching assemblies basically comprises a pair of oppositely connected switching devices 50 and 52, one for the positive half of each AC cycle and one for the negative half of each cycle. In the preferred embodiment of the invention illustrated the switching devices 50 and 52 each comprise silicon controlled rectifier (SCR) type thyristors. Operation of each of the thyristors is controlled by a respective switching circuit including three normally open switches 54, 56, 58 and 60, 62, 64 respectively, closure of which is controlled by depression of a selected side of the one of the two way keys of the wall control panel, as described below.

The positive part of the circuit controlling thyristor 50 will first be described. It will be understood that the negative part of the circuit operates in an equivalent manner. The gate current of thyristor 50 is controlled by a precision firing circuit consisting of silicon bilateral switch 66 which has a specific breakover voltage, or voltage differential, at which it will go into conduction or "fire".

Figure 3:
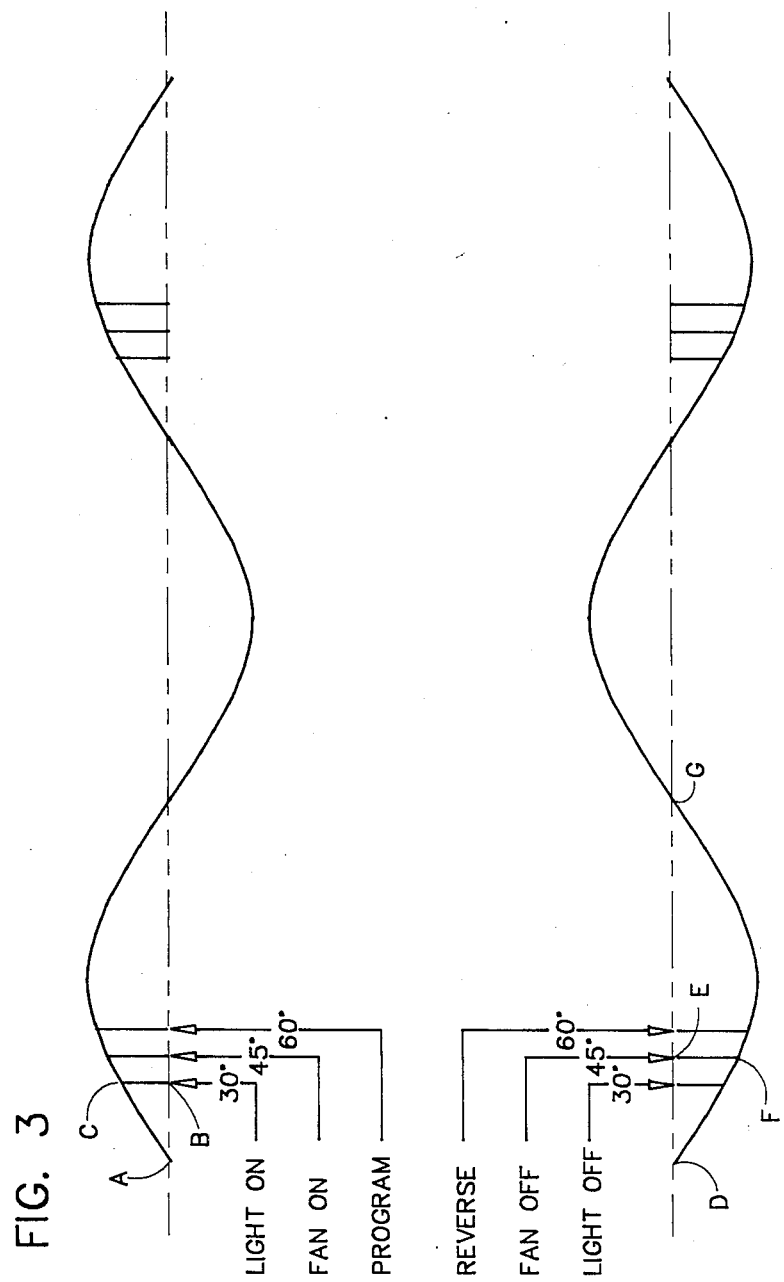
FIG. 3 is a waveform diagram illustrating various different control signals produced by the wall control unit.

When none of the three switches 54, 56 or 58 is operated, or closed, current flows through resistors 68 and 70 to fire thyristor or switching device 50 an instant after the positive going AC voltage passes through zero (zero crossing). If none of the other three switches 60, 62 or 64 are operated either, current will flow through resistors 69 and 71 and thyristor 52 will also be fired an instant after the negative going zero crossing. This means that the wall control unit will be passing a nearly pure AC sine wave as shown in FIG. 3 to the main control unit.

When any one of switches 54, 56 and 58 is operated or closed, a simple charging circuit with capacitor 72 is placed into the thyristor firing circuit. Now the firing of thyristor 50 is delayed until the charging circuit reaches the breakover voltage of switch 66. The values of resistors 74 and 76 in series with switches 56 and 58, respectively, and the value of capacitance 72 are selected and the circuit calibrated such that closure of switch 54 gives a precise 30 degree firing delay, switch 56 gives a 45 degree firing delay, and switch 58 gives a 60 degree firing delay in the positive half of the AC waveform. The signals this produces are indicated by the vertical lines in the upper part of the waveform of FIG. 3. Thus, when switch 54 is closed, for example, the voltage after the positive going zero crossing A will be held at zero until the 30 degree point B or phase of the AC cycle, after which the waveform will continue to follow the standard positive half cycle of the AC waveform from point C.

Similarly, in the negative part of the circuit, a silicon bilateral switch 78 having a specific breakover voltage controls firing of thyristor 52, and the three switches 60, 62 and 64 introduce successive precise firing delays into this circuit by means of time delay or charging circuits including capacitor 80 and the resistance introduced by closure of the specific switch. Thus resistances 82 and 84 are chosen, and the circuit calibrated, such that closure of switches 60, 62 or 64 respectively, introduces precise 30 degree, 45 degree and 60 degree firing delays in the negative half of the AC waveform. This is illustrated by the vertical lines in the lower half of the waveform shown in FIG. 3. Thus a 45 degree delay closure of switch 62, for example, will produce in the negative half of the cycle which will follow points D, E, F and G on the lower part of FIG. 4.

In each part of the circuit a Zener diode 86, 88, respectively, and a resistor 90, 92, respectively, are arranged to form a simple regulator to assure a constant voltage source for the respective timing circuit. This reduces or eliminates effects from line voltage variations. The resistor 94 and capacitor 96 connected across the switching circuit comprise a snubber circuit to prevent transient triggering of the silicon controlled rectifiers (SCR's) 50 and 52.

Thus the wall control circuit allows communication of six different control signals to the main control unit, each comprising different precise firing delays following the positive or negative going crossover (A or D in FIG. 3) of the AC waveform. This allows six different keys to be provided on the wall panel for operation by a user according to the precise function desired. In the preferred embodiment of the invention the keys are provided in pairs as over center toggle devices, one of each pair controlling one of the positive cycle half switches and the other controlling the corresponding time delay one of the negative cycle half switches. In the preferred embodiment the upper toggle switch or keys 22, 23 are arranged to close switches 54 and 60, respectively, when depressed, and therefore comprise an on/off switch for the light. Thus the 30 degree firing delay signal in the positive half of the waveform is used to control switching on of the lights, while the 30 degree firing delay signal on the negative half of the waveform is used to switch off the lights, as will be described in more detail below.

The next pair of toggle keys or devices 24, 25 is used to selectively close switches 56 and 62, respectively, and thus to introduce a 45 degree firing delay signal on either the positive or negative half of the AC waveform. Similarly, toggle keys 26, 27, respectively, close switches 58 and 64 when depressed to introduce a 60 degree firing delay signal on either the positive or negative half of the AC waveform. Each of the switches is arranged to open automatically as soon as the corresponding toggle key is released.

The specific components used in one example of a wall control switching unit as described above will now be listed. However, it will be understood by those skilled in the field that other similar devices may be substituted for each of the specific components listed below in alternative embodiments. In one specific example of the wall control switching circuit thyristors 50 and 52 were part number S4006LS3 SCRs, 6 Amp/400 V, produced by Teccor Electronics, Inc. of Euless, Tex. Bilateral switches 66 and 78 were each part number MBS4991 sold by Motorola Semiconductor Corporation. Resistors 68 and 69 were each 5K ohm single turn cermet potentiometers, set at 2K Ohm, and resistors 70 and 71 each had values of 5.62K Ohm. Resistors 74 and 82 each had values of approximately 4.02K Ohm, and resistors 76 and 84 had values of 6.19K Ohm. Resistors 70, 71, 74, 76, 82 and 84 were all 1% metal film resistors. Capacitors 72 and 80 were each 0.47 microfarad capacitors, and were of 5%/25 V metal film mylar, while capacitor 96 was a 0.1 microfared capacitor of 20%/250 V Mylar or equivalent. Zener diodes 86 and 92 were the commonly available 1N5245 type. Resistors 90 and 92 were 6.2K Ohm 5% carbon film resistors, and resistor 94 was 120 Ohms 5% Carbon film. Metal film resistors were chosen for temperature stability.

Power switch 28 may suitably be a 4 Amp/125 VAC slide switch, or equivalent, and switches 54 to 64 inclusive are PCB dome switches or snap-disc switches in the preferred embodiment, situated under the respective corresponding two way control keys on the external control panel. Thus in the preferred embodiment each of the pairs of control keys comprises a two way pivot member which can be pushed in at either end to depress and close an underlying dome switch on the wall control unit printed circuit board, and the dome switches are biassed to open once the pivot member or control key is released.

In the preferred embodiment of the wall control unit additional output wires are provided from the unit as shown at 98. These are unused in this embodiment but are intended for use in 3-way circuits in alternative embodiments of the invention. The main control unit 14 will now be described in more detail with reference to FIG. 4 and 5.

The detector assembly 30 incorporates a precision digital timing circuit which watches the input voltage waveform on line 19 from the wall control unit 16 and which determines the zero crossing point of the waveform, the phase of the waveform (positive or negative), and the magnitude of the phase firing delay, which may be 0, 30, 45 or 60 degrees.

Figure 4:
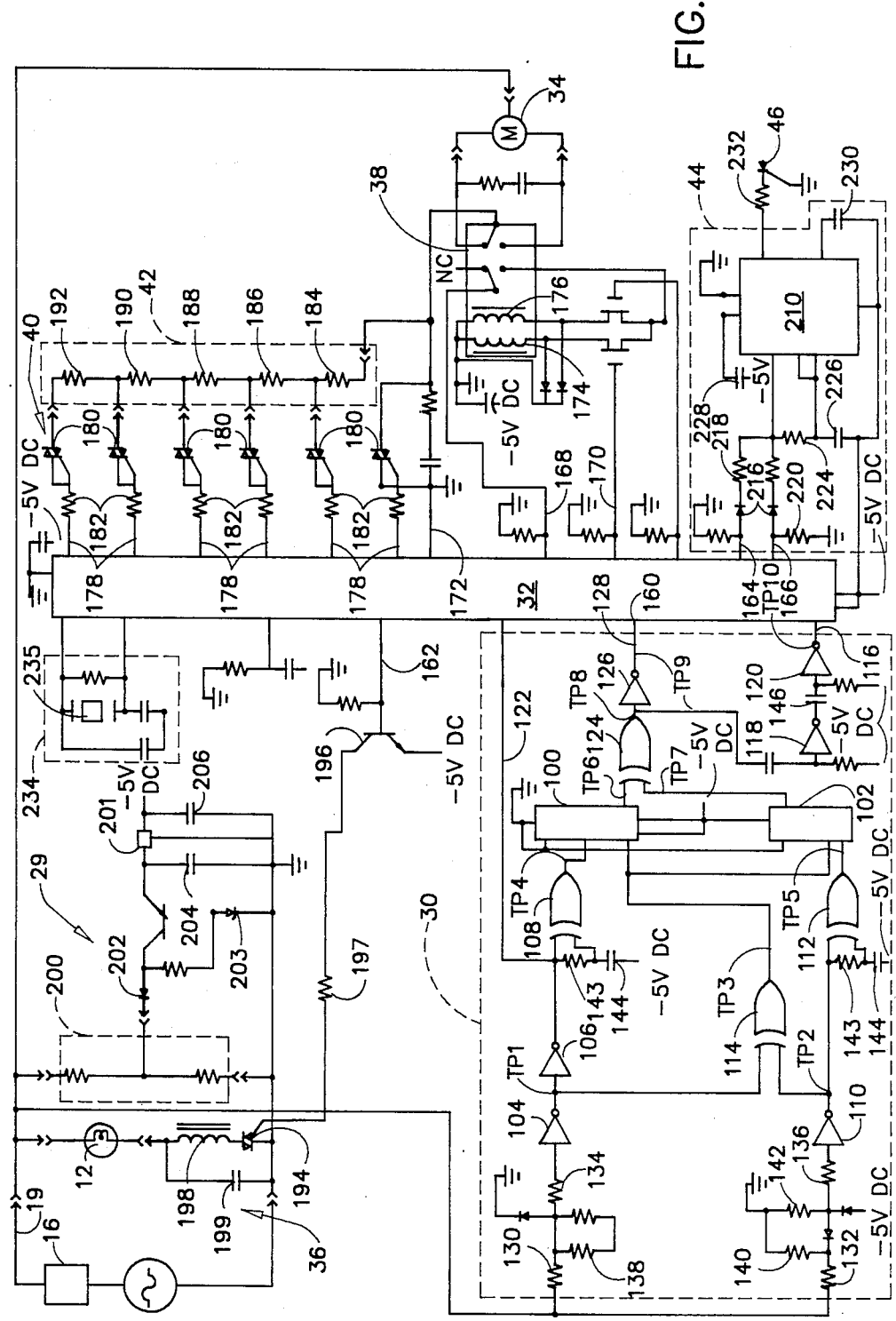
FIG. 4 is a schematic circuit diagram of the main control unit responsive to the wall control signals to control operation of the fan and light.

As shown in FIG. 4, the detector circuit consists of two parts, one of which is responsive to the positive part of the input on line 19 and the other of which is responsive to the negative part of the input. The positive part consists of a series of two inverters 104 and 106 and an OR gate 108, the output of which is connected to the RESET port of a first flip-flop 100. The negative part consists of an inverter 110 and an OR gate 112 connected to the RESET port of a second flip-flop 102. The outputs of inverter 104 and 110 are connected through a further OR gate 114 to the clock inputs of the two flip flops. A phase control signal is provided on line 122 from the output of inverter 106. The Q outputs of flip-flops 100 and 102 are connected to the two inputs of OR gate 124, and the output of OR gate 124 is connected to an inverter 126 to provide a data control signal on line 128. A zero crossing output control signal is provided on line 116 from OR gate 124 through one-shot 118 and inverter 120.

In the preferred embodiment of the invention the components used in the detector circuit are as follows, although it will be understood that alternative devices may be used in other embodiments. Inverters 104, 106, 110, 118, 120 and 126 are provided by Hex Schmidt inverter part number CD4584 which is available from various manufacturers. OR gates 108, 112, 114 and 124 are provided by a single Quad Exclusive OR gate part number CD4070 produced by various manufacturers. Flip-flops 100 and 102 are also provided by a single chip device, Dual D flip-flop part number CD4013 produced by various manufacturers. Other components of the detector circuit in the preferred embodiment include input resistors 130, 132, each preferably of 100K Ohm, resistors 134, 136 of 1K Ohm, resistor 138 (10K Ohm), resistor 140 (56K Ohm), and resistor 142 (100K Ohm). OR gates 108 and 112 each have a resistor 143 and capacitor 144 connected to their inputs as shown in FIG. 4, and these have preferred values of 100K Ohm and 0.01 microfarads, respectively. A capacitor 146 suitably of 0.01 microfarads is connected in the output line between one-shot 118 and inverter 120.

Figure 5A:
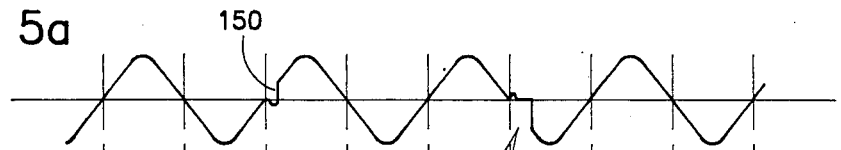
FIG. 5A is a waveform diagram illustrating two representative control signals impressed on the typical AC voltage curve.

The operation of the detector circuit will best be understood with reference to FIGS. 5A to 5K, where a representative input AC waveform from the wall control unit is shown in FIG. 5A and the other pulsed signals represent outputs at various points in the detector circuit marked as TP 1 to TP 10, inclusive, on FIG. 4 as a result of such an input signal. The input control signal waveform of FIG. 5A shows a standard AC waveform for the first cycle, followed by a 30 degree firing delay 150 in the positive half of the AC waveform (produced by closing switch 54), then another standard waveform cycle followed by a 60 degree firing delay 152 in the negative half of the cycle (produced by closing switch 64).

Figure 5B:
FIGS. 5B to 5K show the pulse outputs at various points in the detector part of the circuit of FIG. 4 with a signal input as in FIG. 5A.

FIG. 5B shows the output of inverter 104 at point TP1. This portion of the circuit looks only at the positive half of the AC waveform. The inverter 104 turns off when the rising waveform reaches approximately 10 volts, which normally happens quickly after a standard positive going zero crossing. However, when the rise in the waveform after a zero crossing is delayed by the wall control unit, as indicated at 150 in FIG. 5A, turn off of inverter 104 will also be delayed, as can be seen by lengthened pulse 154 in FIG. 5B. The inverter turns on again when the descending waveform reaches approximately 10 volts, just before the next zero crossing. Thus the length of the output pulses from inverter 104 are controlled by closure of switches 54, 56 and 58 of the wall control unit, which in turn control the firing delay which delays turn off of the inverter. Inverter 106 simply inverts the output of inverter 104, and supplies this information on line 122 to a phase control input 156 of the microprocessor or microcomputer 32. The microcomputer is programmed to look at the information at input 156 only approximately 7 milliseconds after each zero crossing.

Figure 5C:

FIG. 5C shows the output of inverter 110 at point TP2, which is in the portion of the circuit looking at only the negative half of the AC waveform. The inverter 110 turns off when the rising waveform reaches −10 V (just before positive going zero crossing) and turns on again when the descending waveform reaches approximately −10 V (just after the negative going zero crossing). Thus the point at which the inverter 110 turns on can be delayed by actuation of switches 60, 62 or 64, and a representative 60 degree shortened pulse 158 produced by closure of switch 64 to produce firing delay 152 is shown in FIG. 5C. Thus closure of switches 54, 56 and 58 will produce shortened positive pulses at the output of inverter 106, and closure of switches 60, 62 and 64 will produce shortened pulses at the output of inverter 11, with the length of the shortened pulse being dependent on which switch is closed.

Figure 5D:

FIG. 5D shows the output of OR gate 114, whose inputs are the outputs of inverters 104 and 110, respectively as shown in FIGS. 5B and 5C. This leads to a pulse that is present at every zero crossing and whose duration contains the signalling information. This signal is used to clock the two flip-flops as indicated in FIG. 4.

Figure 5E:
Figure 5F:

FIGS. 5E and 5F are the outputs of gates 108 and 112 at points TP4 and TP5, respectively. Gates 108 and 112 are used as simple edge detectors to produce a pulse at the edge of each input pulse. The time constant of the resistor/capacitor network 143, 144 on the input of each of these gates provides a relatively long reset pulse (over one millisecond) to the reset ports of the two flip-flops.

Figure 5G:
Figure 5H:
Figure 5I:
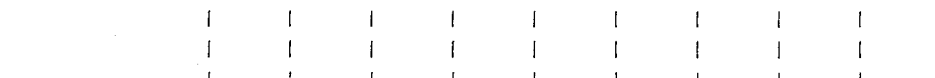
Figure 5J:
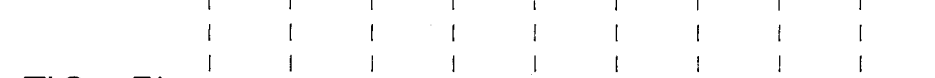

FIGS. 5G and 5H show the output signals from flip-flop 100 and 102, respectively, which are recombined in OR gate 124 to provide the signal shown in FIG. 5I. This signal is inverted by inverter 126 to provide the data control signal shown in FIG. 5J on line 128 which is connected to a control input 160 of the microprocessor. This signal is combined with the phase control signal input by the computer to determine which of the six control keys has been depressed, as explained in more detail below.

Figure 5K:

The output of OR gate 124 is also connected through one shots 118 and 120 to provide the signal shown in FIG. 5K online 116, which is provided to an input 159 of the microprocessor as a zero crossing control signal. Inverters 118 and 120 are used as one shots to create a final, fixed width zero cross pulse for the microprocessor, which provides the necessary timing function for detecting the presence of control signals from the wall control unit, for other internal microcomputer operations, and for output related functions as discussed in more detail below. The input to inverter 118 may alternatively be taken from OR gate 114, but the arrangement shown in FIG. 4 provides a more accurate zero cross signal. The signal exiting OR gate 124, combined with one shots 118 and 120, assures a very accurate negative going pulse to signal zero-cross to the computer.

Note that the input waveform shown in FIG. 5A shows a "kick" in the waveform after zero crossing whenever the flow of current is interrupted by a signalling event as the result of closure of one of the wall control switches. This is due to the back emf from the highly inductive AC motor used in the system. By following the flow of data, it can be seen that the "kick" is carried to the output of gate 114 (FIG. 5D) and attempts to clock the flip flops. However, looking at the example of the 60 degree firing angle on the negative half of the waveform, one flip flop 102 is clocked, the "kick" can have no effect since the flip flop can only be reset by a pulse into the reset port from OR gate 112 (FIG. 5F). This occurs only when the pulse from the edge detector arrives, and this is in synchronization with the firing of the SCR 52 at the 60 degree firing angle. Thus the timing information is preserved in spite of the back-emf "kick".

The microcomputer 32 is pre-programmed to process the control data by determining the time width of the data pulse at input 160 on each half cycle. It determines which of four pulse width windows (corresponding to 0, 30, 45 and 60 degree firing delays) the data pulse fits, then looks for the signal to be repeated. The microcomputer program requires any signal corresponding to firing delays other than 0 degrees to be present for a total of 12 consecutive cycles before declaring it to be valid and executing the corresponding commands. The microcomputer operation is described in more detail below with reference to the flow diagram of FIG. 6.

Control outputs from the microcomputer are connected on line 162 to the lamp driver 36, and on lines 164, 166 to the audio driver 44. Output lines 168, 170 are connected to reversing relay 38, and input line 172 from the reversing relay enables the microcomputer to determine the current status of that relay and thus determine whether the fan airflow direction is up or down and to determine which of two relay coils 174, 176 must be energized whenever reversing is called for.

A series of motor speed control outputs 178 are provided from the microcomputer. Each speed control output 178 is connected to the motor driver 40, which as shown in FIG. 4 comprises a series of motor control triacs 180 each of which has an input connected through resistor 182 to a respective one of the speed control outputs 178.

The motor control triacs each have outputs connected to successive taps in resistor array 42 to introduce selected resistances in series with the motor to control its speed. The first triac is connected directly to the motor, and the next five triacs are connected to a series of successive taps between resistors 184, 186, 188, 190 and 192 in the array.

The motor control triacs preferably have low DVDT sensitivity and in a preferred embodiment of the invention six different speed control outputs 178 were provided, corresponding to speeds 1 to 6 inclusive. Clearly a greater or lesser number of possible speeds may be provided if desired. Based on the expected motor loads at the specified speeds, TO 92-sized triacs may be used for the lower speed settings 1 to 3 while a TO 220-size is needed for speeds 4 to 6. In one specific example of the motor driver circuit, the top two motor control triacs of FIG. 4 may be part number L401E5 produces by Teccor, or equivalents, and the other four motor control triacs may suitably be part number L4004F51, also produced by Teccor, or equivalents. A low DVDT sensitivity motor control triac is desirable to prevent unwanted, temporary motor operation during signalling for light operation. Resistors 182 each comprise 1.2K Ohm resistors.

The motor speed is controlled by electronic selection of the taps within resistor array 42 connected in series between the triacs 180 and the motor 34. The resistor array 42 is preferably in the form of a flexible printed resistor pattern of wires bonded to silicon rubber and valcanized, although other types of resistor array may be used. The lead wire material may be Telfon or Mylar flat cable. The series of resistors in the array 184, 186, 188, 190 and 192 have values 50 Ohms, 54 Ohms, 66 Ohms, 105 Ohms and 175 Ohms, respectively in one embodiment. However, different resistance valves may be used if different speed settings are desired. The six fan speeds produced by introduction of successive resistors into the series in the preferred embodiment are as follows:

| Speed setting | RPM | Approx. Res. |
| --- | --- | --- |
| 6 | 200 | 0 |
| 5 | 140 | 55 Ohms |
| 4 | 100 | 100 |
| 3 | 75 | 190 |
| 2 | 50 | 350 |
| 1 | 25 | 700 |

The use of a flexible resistor array to control the fan motor speed provides a substantially pure sine wave to the motor at any speed, assuring relatively silent operation through speed changes. Another advantage is that the zero crossing point information is preserved. A circuitous pattern is provided in the array to spread heat dissipation out over as large a surface as possible to minimize hot spots, and the array may be mounted on the motor housing or dissipating heat.

As shown in FIG. 4, the light driver 36 is a conventional light dimmer control circuit comprising a triac-type phase control. Light control triac 194 has its gate connected to the lighting control output 162 from microcomputer 32 through transistor amplifier 196 and resistor 197, and inductor 198 is connected between the triac and lamp. Connected across the triac and inductor 198 is capacitor 199. The microprocessor is programmed to provide a desired ramp rate for the light by producing an output pulse on line 186 at prdetermined intervals after zero crossing to trigger the triac at a suitable phase between a lowest intensity or power setting to a highest intensity setting. In the preferred embodiment the light can be ramped in 16 steps between the lowest intensity and the highest intensity setting in 5 seconds, or vice versa. Triac 194 is suitably a 5 amp rated triac with low DVDT sensitivity and is provided with an ample heat sink to handle the maximum lighting load, which may be of the order of 340 watts.

In one specific example of a light driver circuit used in the system of this invention, the following components were used. However, it will be understood by those skilled in the field that alternative equivalent components may be used in different embodiments. The light control triac was a part number L4006L manufactured by Teccor. Transistor 196 was part number 2N3904 produced by various manufacturers. Resistor 197 had a value of 100 Ohms, inductor 198 was a 120 UH, 4 Amp bar configuration inductor, and capacitor 199 had a value of 0.047 microfarads. Resistor 196 had a value of 5.1K Ohm.

The power supply 29 is a basic voltage regulator circuit utilizing resistive network 200 to reduce the input voltage to 10 VAC and voltage regulator 201 to tightly control the supply at 5 VDC. The power supply is capable of maintaining memory during brief power interruptions of less than 1 second. The specific components used in the power supply circuit in one example will now be given, although it will be understood that other, equivalent components may be used. The resistive network 200 was a flexible resistor array with a first portion of 510 ohms and a second portion of 1500 ohms. The voltage regulator 201 was part number LM7905 also available from various manufacturers, and capacitor 204 had a value 470 microfarads with capacitor 206 having a value of 10 microfarad. Diode 202 was a part number 1N4004, and diode 203 was a part number 1N5930.

The audio driver 44 is designed to produce a two-tone signal at speaker 46, with the signal comprising an ascending two-tone chime on fan or light turn on, or fan speed increase, and a descending tow-tone chime on fan turn off or speed decrease. The tone frequencies are chosen for general pleasantness to the hearer with the selected speaker, and preferably last no longer than a total of 0.5 seconds. In one particular example of the invention the audio driver or frequency generator comprised timer 210, suitably part number LM5555CN or equivalent, produced by various manufacturers, connecting to high and low control inputs 164, 166, respectively, from the microprocessor through diodes 216, each of which may be part number 1N4148 or equivalent diodes, and resistors 218 and 220, respectively, having values of 1K and 10K, respectively. A control pulse on line 164 produces a high tone frequency output, and a control pulse on line 166 produces a low tone output from speaker 46. Thus the control output from microprocessor 32 determines whether an ascending or descending frequency audio signal is produced at speaker 46, as will be described in more detail below. Also provided in audio driver circuit 44 are resistor 224 of 6.8K, capacitor 226 of 068 microfarads, and capacitors 228 and 230 each of 0.01 microfarads. The audio transducer or speaker 46 is connected to the audio driver output through resistor 232 which is a 47 Ohm resistor. Although a specific example of an audio driver circuit has been given above, it will be understood by those skilled in the field that there are many possible alternative circuits for producing two tone outputs and any of these may be used in the control system of this invention.

The microcomputer 32 operation to provide the various control pulse outputs on lines 162, 164, 166, 168, 170 and 178 as generally described above will now be explained in more detail with reference to the flow diagram of FIG. 6. The microcomputer is programmed to detect the input command signals on lines 116, 122, and 128 from the detector circuit, to determine which of eight possible input codes is present at any one time, and to associate that specific code with a programmed sequence of events which are initiated whenever that code is validated. The eight possible codes correspond to +0, +30, +45, +60, −0, −30, −45 and −60 degree phase delays, respectively. The program requires any signal other than + or −0 to be present for a total of 12 consecutive cycles before carrying out the operation associated with that signal. This corresponds to an operator pushing down one side of one of the control keys for at least 0.1 seconds.

The microcomputer used in one example was a Sanyo LM6413 microcomputer. However, it will be understood that other equivalent microcomputers may be used in alternative embodiments. In FIG. 4 the circuit 234 is a standard microcomputer clock input circuit including an 800 KHz resonator 235, and this circuit will not be described in more detail since such circuits are well known in the field.

Figure 6A:
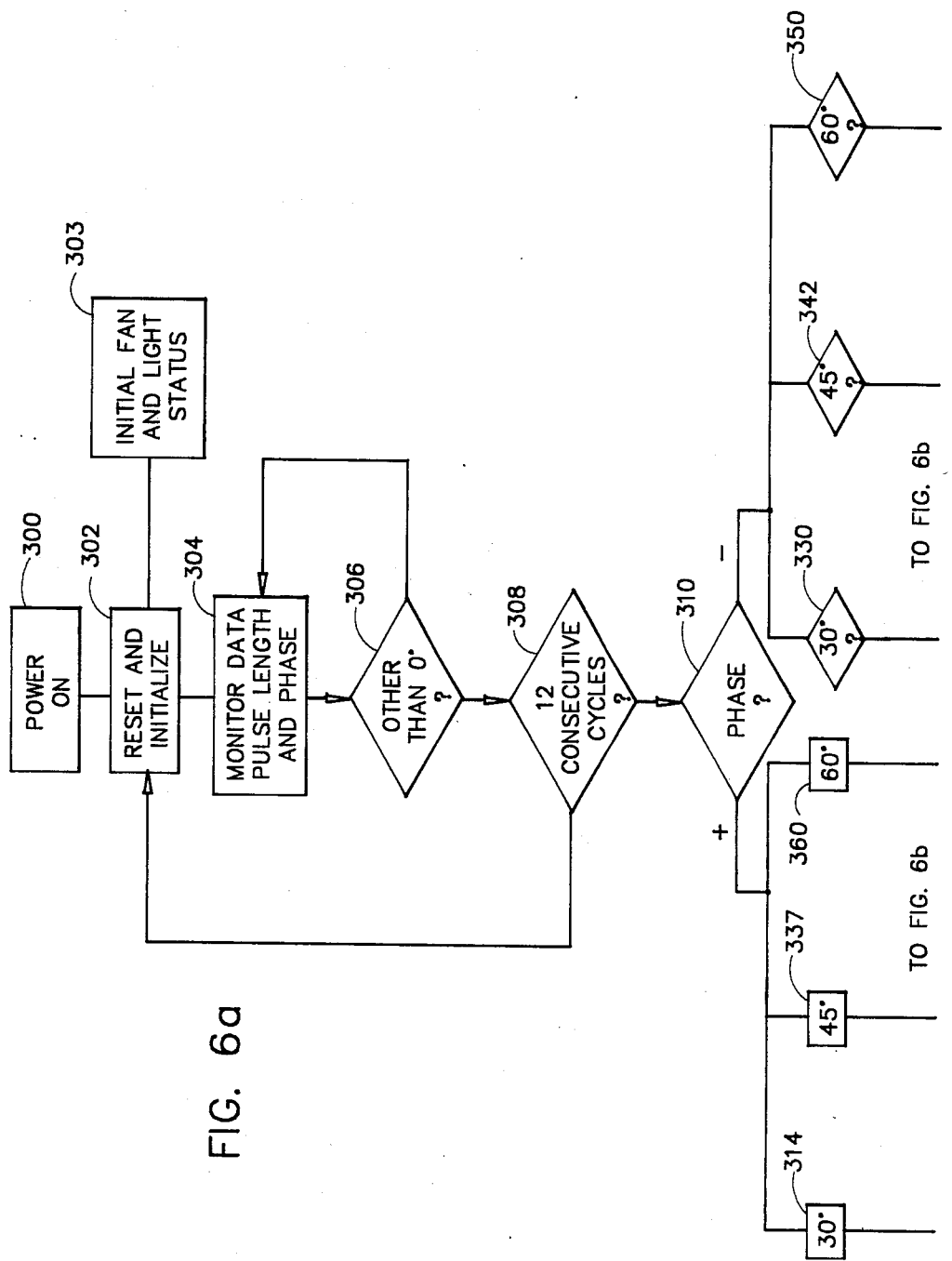
FIGS. 6A and 6B show a program flow chart illustrating operational steps performed by the microprocessor of the main control unit of FIG. 4.
Figure 6B:
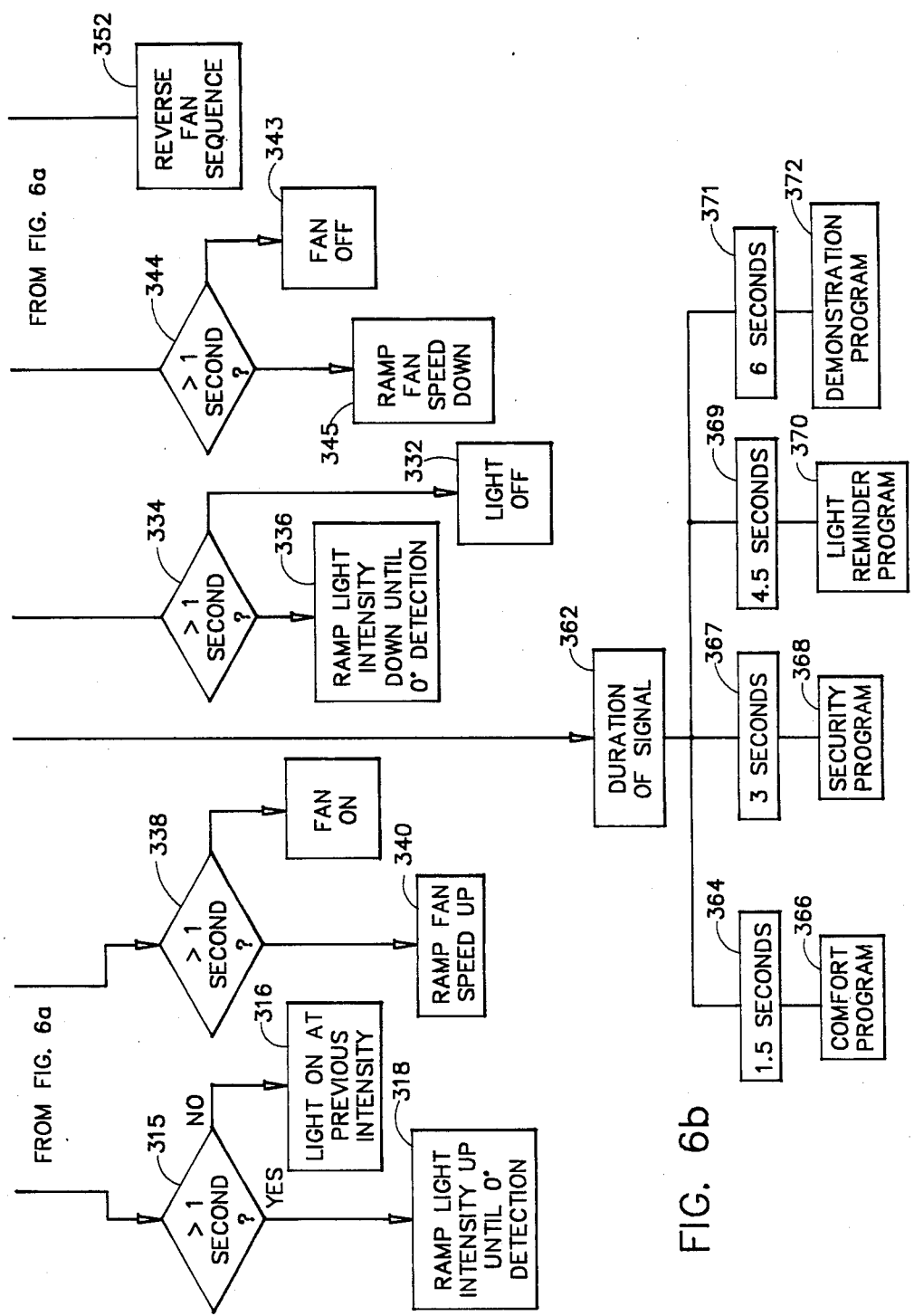

The microcomputer is programmed to carry out the steps listed generally in FIGS. 6a and 6b described in more detail below. When power is initially switched on (300), or following power interruptions of more than 1 second, the microcomputer resets and initializes (302) with the following status (303):

1. Reversing relay status is checked on line 172 controlled on lines 168, 170 into an airflow downward status (i.e. fan direction to blow air downwards for cooling airflow effects).
2. Light intensity is controlled on line 162 to be high.
3. Light status (line 162) is OFF.
4. Fan speed setting is low speed (speed setting 1)
5. Fan status is OFF.
6. Special programs : OFF
7. Audio driver: OFF The microcomputer then continually monitors the control signal inputs on lines 116, 122 and 128 for anything other than a 0 degree phase delay on the positive or negative half of each cycle (step 304, 306). If any non-zero signal is present for at least 12 consecutive cycles (308), the micrcomputer determines the phase (310) and length of the delay according to the length of the input data pulse. If a positive delay of 30 degrees is detected (314), which lasts for less than 1.0 seconds, the lights are turned on at the previous intensity, (316) as stored in the microcomputer memory. If an operator wishes to ramp up the light intensity, the switch 54 is depressed via control key 22 for longer than 1.0 seconds. This is detected by the microcomputer (315), which ramps the light intensity upwards in equal steps (318) until the switch is released, which is detected by a 0 degree pulse length signal on data control line 128. Thus the light intensity can be set as desired by pushing button or key 22 and releasing it when the desired level is reached. The light intensity is ramped as described above by triggering light drive triac 194 at increasing voltage levels.

In the preferred embodiment of the invention the microcomputer is programmed to turn the lights on gradually, i.e. when a lights on input signal is received, the microcomputer slowly ramps the light power on control line 162 from low to full-on or previous intensity in a predetermined time period, for example of the order of 1.5 seconds. This slow turn on extends light bulb life by minimizing or reducing the shock of turn on, and also reduces eye strain of the user.

If a −30 degree phase delay signal is detected (330) and is present for less than 1.0 seconds, the microcomputer turns the lights off (332). Preferably, the lights off step is a delayed procedure in which the light intensity is reduced gradually to zero, to give the user time to move to another room before the lights actually turn off. In the preferred arrangement the program reduces the light intensity immediately by about 25% when the light off button is first pushed, then after about 12 seconds begins ramping the light intensity downward to low intensity, then turns the lights off. If the lights OFF button is pushed a second time during this period, the light is turned off immediately.

If the −30 degree signal is detected by the microcomputer for longer than 1.0 seconds (334), i.e. the user has pushed the lights OFF button and holds it down for more than 1.0 seconds, the microcomputer is programmed to ramp the light intensity downward (336) until the 0 degree signal is again detected, indicating that the user has released the button. This allows the user to reduce the light intensity as desired. The microcomputer is programmed to store any selected light intensity in its memory for subsequent operations of the lights until an operator again alters the intensity.

The +45 degree signal 337 is associated by the computer with a command to turn on the fan. If it is present for less than 1.0 seconds, indicating only a quick push and release of fan ON button 24, the fan is turned ON at the previously stored fan speed along the appropriate one of the control lines 178 energizing the appropriate motor driver triac 180 to introduce the corresponding resistance into the motor circuit and thus switch on the fan motor at the appropriate speed. If the fan ON signal is present for over 1.0 seconds (338), the fan speed is ramped upwards (340) by energizing successive triacs in the motor driver to decrease the resistance and increase the speed setting until a 0 degree control signal is again detected, indicating the fan ON button has been released. Thus the user can set the fan speed by releasing the ON button at the desired level. Any speed set in this way will be stored in the microcomputer memory for subsequent operations.

If a −45 degree signal 342 is detected for less than 1.0 seconds, the fan is turned OFF (343). If the signal is present for over 1.0 seconds (344), indicating the user has pushed and held down the fan OFF button 25, the fan speed is ramped downwards (345) through the speed settings by energizing successive triacs in the motor driver to increase the resistance in the motor circuit until 0 degree signal is again detected. This allows the user to reduce the fan speed until a desired lower level is reached by releasing the OFF button at the desired level.

The upward and downward ramp rate for the fan is preferably such that it can be ramped from speed 1 to speed 6 in 9 seconds or vice versa. During upward ramping of speed, full power is applied at each step for 0.5 seconds in order to minimize lag between the speed called for and the actual speed of the fan. During downward ramping, all power to the motor is turned off and the fan is allowed to coast until power is reapplied at the selected speed.

Preferably, the +45 and −45 degree signals also initiate operation of the audio driver in the following manner. On detection of a speed increase or fan turn-on command (337), the microcomputer controls the audio driver on lines 166, 164 to emit a quick ascending two tone chime sequence to confirm reception of the command. On a speed decrease step or fan turn off command (342), a quick, descending two tone chime is sounded. These are sounded at each speed increase or decrease step, respectively.

The −60 degree signal 350 is associated with a fan reversal command initiated by the user pushing REVERSE button or key 26. On detection of this signal, a reverse fan sequence 352 is initiated which consists of the following steps:

1. A two tone descending audio signal is sounded by control on lines 164, 166 to indicate reception of the command.
2. Power to the motor is turned off.
3. The reversing relay is switched to the opposite direction after approximately 0.2 seconds delay.
4. Power is reapplied to the motor by energizing the appropriate motor triac/80 approximately 0.4 seconds after step 3. If the preset motor speed is 3 or slower, the preset power level is applied directly. If the preset speed is 4 or higher, power is reapplied first at speed 3 for one second before increasing to the pre-set level.

This sequence, which enables the reversing relay to be switched "dry", i.e. when no current is being conducted through the contacts, assures relatively long contract life, eliminates or reduces the possibility of electrical transients which could otherwise cause the microcomputer memory to be scrambled, and allows the use of a low cost relay.

The +60 degree signal 360 is associated in the computer program with a series of special programs. The program selected depends on the duration of the +60 degree signal, i.e. how long the user depresses PROGRAM button or key 27 before releasing it. The +60 degree sequence of steps is as follows:

1. Determine duration of +60 degree signal (362).
2. Sound two tone audio signal every 1.5 seconds during duration of +60 degree signal.
3. If duration of signal is 1.5 seconds (364), initiate COMFORT program 366.
4. If duration of signal is 3.0 seconds (367), initiate SECURITY program 368.
5. If duration of signal is 4.5 seconds (369), initiate LIGHT REMINDER program 370.
6. If duration of signal is 6.0 seconds (371), initiate DEMONSTRATION program (372).

Clearly any number of alternative special programs may be provided in a similar fashion by suitably programming the microcomputer. The special programs referred to above which are provided in one embodiment of the present invention will now be described in more detail. The desired program is selected by the user by depressing the PROGRAM button until a corresponding number of audio signals are heard, i.e. one signal for COMFORT, two for SECURITY, and so on, and then releasing the button.

Only one program may be selected and engaged at any one time, and the selected program may be cancelled either by turning the power switch off for three sounds or by holding the REVERSE side of the REVERSE/PROGRAM key down until an audio signal is heard indicating cancellation.

The COMFORT program is a fan speed reducing program which may be utilized at night, for example, to reduce the fan speed gradually according to the reduced need for cooling that would be encountered in a bedroom, for example. This program causes the fan speed to reduce by one setting after 1.5 hours of running time following initiation of the program. 2.5 hours later the speed is reduced one more setting. The speed may be altered manually by the fan OFF and ON buttons during running of the programs, but the timing of events remains unaltered. While the program is in operation, the light, fan and reverse/program control panel buttons remain effective. The program is self-cancelling after one cycle, requiring resetting by the user every night if required.

The SECURITY program provides on and off control of the lighting to give the impression of an occupied home. The program follows the following sequence:

1. Indicate acceptance of SECURITY program command by two audible signals and a flashing of the lights (suitably twice from previous intensity setting to low setting).
2. Turn lights ON at full intensity.
3. Lights ON for 30 minutes.
4. Lights OFF for 30 minutes.
5. ON for 120 minutes.
6. OFF for 60 minutes.
7. ON for 60 minutes.
8. OFF for 120 minutes.
9. ON for 15 minutes.
10. OFF for 60 minutes.
11. Repeat cycle from 3 to 10 continuously.

When this program is in operation, the LIGHT and FAN control panel buttons are ineffective. The REVERSE/PROGRAM button is still operative to cancel the SECURITY program or select another program. Clearly other lighting sequences may be used in the program in alternative embodiments.

The LIGHT REMINDER program will turn the lights off automatically 90 minutes after each time they are turned on by the user. It is announced by three audible signals. At the end of the 90 minute period, the lights are dropped to half intensity for 30 seconds, then turned off. This is to give a warning to any occupant of the room. This program is designed for use in rooms that are typically not lit for extended periods of time and where lights are often left on inadvertently. When this program is in operation, the control panel keys all remain effective. The user may alter the light intensity setting, but the lights will still be turned off after the designated time period unless the ON/OFF key is operated to turns the lights off and back on again.

The demonstration program is intended for use in demonstrating the flexibility of the system or testing its operation. On initiation of this program, a pre-programmed sequence of light and an events is carried out, including ramping up and down of the fan speed and light intensity, and reversing of the fan.

The control system of this invention therefore allows two or more electrical appliances to be controlled independently from a plurality of wall switches without requiring any requiring of a standard household electrical circuit. This is done by detection circuitry which can distinguish precise time events after each zero crossing, so that a plurality of control signals comprising predetermined length signal delays after positive or negative going zero crossings can be provided, each initiated by actuation of a different wall switch or control button. In this way the back emf kick from the fan motor will be ignored by the detection circuit.

Although in the above described embodiment six different control signals are provided, a greater or lesser number of such signals may be provided in alternative embodiments by suitable adjustment of the wall control unit circuitry, and any desired phase delays may be used by adjustment of the timing circuits. In the preferred embodiment described above the + and −30 degree phase delay signals are associated with lighting control by appropriate programming of the microcomputer. This provides a solid, easily detected signal that is on the fringe of the back emf "kick" of the fan motor, and produces the least reduction in available power. It is therefore preferably used for control of the lights, so that the light intensity will not be dimmed appreciably by depression of the light ON/off key. The 45 degree firing delay signal reduces the available power slightly more, and is used in the preferred embodiment for the fan ON/OFF and fan speed DOWN/UP signals. The 60 degree signal gives the greatest reduction in power to the main controller, and is capable of generating objectionable motor noise. For this reason the fan motor is preferably turned off during these signals. Their may be some noticeable dimming of the lights during the 60 degree signalling, but the user will recognize this as an indication of proper signalling and full intensity will be restored when the appropriate control button is released.

As long as the power switch remains on, the last light intensity and speed settings are memorized by the microcomputer when these appliances are turned OFF at the appropriate OFF control buttons, and they are automatically returned to the previous settings when turned ON again.

This control system allows for increased flexibility and easy operation by providing a plurality of different control signals each initiated by the user on depressing a signal control button or key. Thus the user does not have to memorize various multi-key sequences for alternative operations, but can turn the lights or fan on or off, increase or decrease the fan speed or light intensity, reverse the fan or select any one of a series of programs, all by means of a single pushbutton or switch operation.

The system does not rely on detecting critical analog voltage levels, which may vary and give rise to errors, but involves only the timing of events following each zero crossing of the AC line voltage. Because the precision digital timing or detector circuit can tolerate phase shifting, a transformer based power supply may be used.

Figure 2:
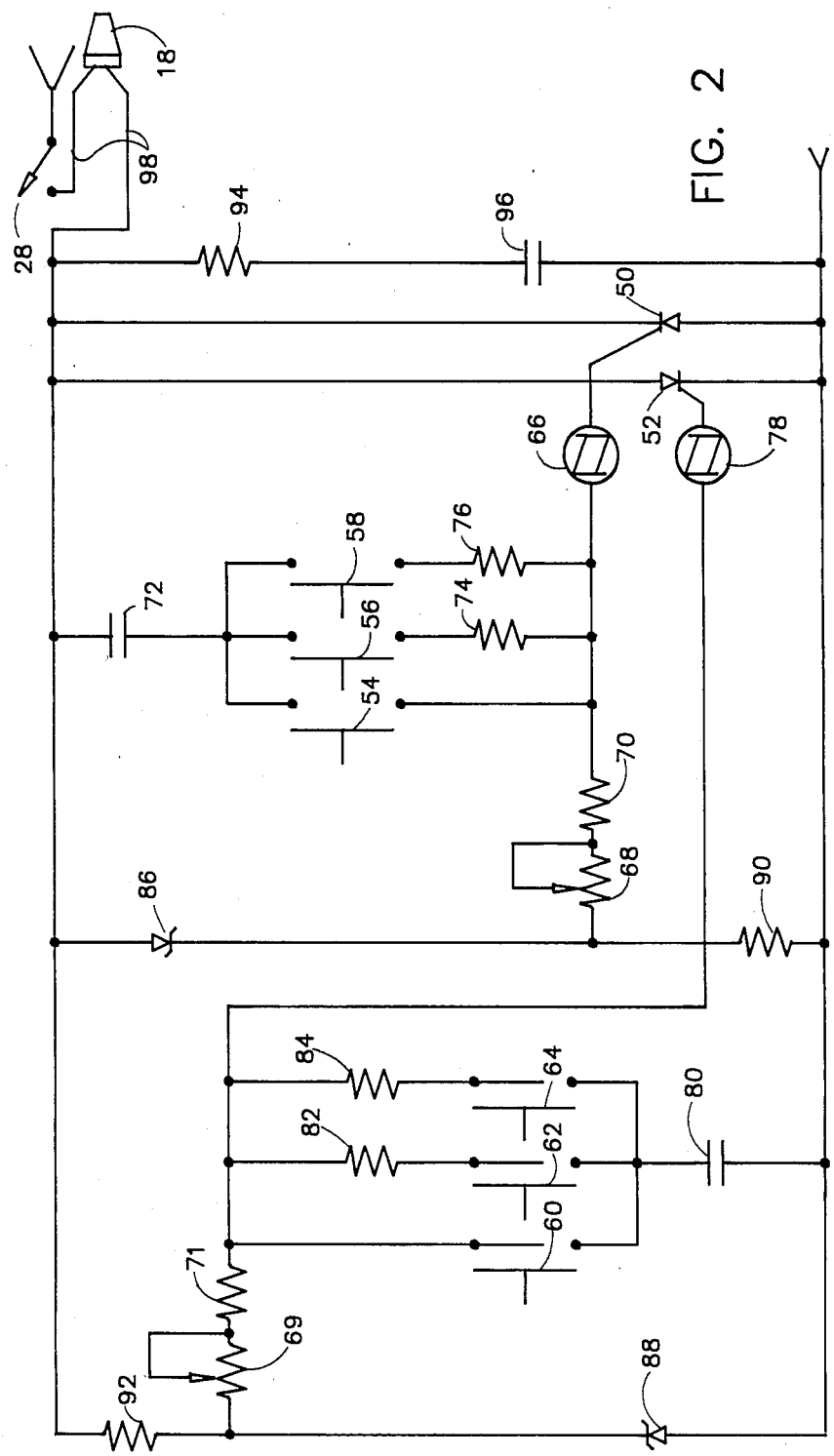
FIG. 2 is a schematic circuit diagram of the wall control unit of the system of FIG. 1.

The wall control firing circuit of FIG. 2 includes a highly stable power regulator for maintaining precise firing angles over wide variations in line voltage or fan load.

Thus a relatively complex variety of operations are provided by the system in an easy to use a manner since the user only as to operate a selected one of three dual function buttons in order to initiate any one of many possible alternative desired operations. The electronic circuitry of the control system is relatively simple, inexpensive and reliable. The system can easily be expanded to provide additional program sequences simply by reprogramming the microprocessor. Since the wall control unit is polarized, it must be initially be installed the right way round for correct operation, although no damage can be caused by reverse installation. The microprocessor may be provided with a device for detecting the installation polarity in alternative embodiments.

It should be noted that the system may be used to operate a fan which is not equipped with lights. In this case the light switch will simply be ineffective. It may alternatively be used to operate other or additional electrical appliances by suitable modification of the wall control unit to provide additional delay signals.

Although a preferred embodiment of the invention has been described above by way of example, it will be understood by those skilled in the field that modifications may be made to the disclosed embodiment without departing from the scope of the invention, which is defined by the appended claims.

We claim:
1. A system for remotely controlling at least two electrical appliances powered by an AC power source, comprising:

a series of manually operable switches;
control signal generating means responsive to actuation of the switches for providing a firing delay in the AC sine wave after a zero crossing; each switch corresponding to a delay signal of predetermined length in a predetermined polarity half of the AC signal distinct from all the other switch signals;
delay signal detecting means connected to said generating means for detecting said delay signals and producing control pulses in response to said delay signals; said detecting means comprising first control means for detecting the polarity of the delayed half of an input AC signal and producing an output polarity control signal, and second control means for producing a control signal pulse of length dependent on the half cycle length of the input AC signal, each control signal pulse produced by said delay signals having a predetermined length shorter than the standard AC half cycle pulse length; and
programmable control means for controlling operation of said electrical appliances in response to stored program instructions and detection of said polarity control signals and control signal pulse length; said program instructions including means for associating each shortened control signal pulse length of each polarity with a predetermined control function, said control functions including means for switching each appliance on and off, and means for initiating a series of pre-programmed sequences of operations of said appliances.

2. The system as claimed in claim 1, wherein said delay signals comprise 30, 45 and 60 degree firing delays in the positive and negative halves of the AC cycle.

3. The system as claimed in claim 2, wherein said control functions include means for for switching a light on and off and for controlling the light intensity in response to said 30 degrees firing delay signals.

4. The system as claimed in claim 2, wherein said program instructions include means for switching a fan on and off in response to a 45 degree firing delay in the positive and negative half, respectively, of the AC cycle.

5. The system as claimed in claim 2, wherein said program instructions include means for initiating a predetermined sequence of events in response to a 60 degree firing delay in either half of the AC cycle.

6. The system as claimed in claim 1, wherein said programmable control means comprises a microcomputer for controlling operation of a combination ceiling fan and light assembly, and said manually operable switches include a first, light ON switch for turning the light on, a second light OFF switch for turning the light off, a third, fan ON switch for turning the fan on, and a fourth, fan OFF switch for turning the fan off.

7. The system as claimed in claim 6, wherein said control signal generating means comprises a timing circuit for producing a series of predetermined firing delays in an input AC signal, and said switches are connected in said circuit, each switch comprising means for completing a timing circuit to produce a predetermined firing delay associated with said switch on closure of said switch by an operator.

8. The system as claimed in claim 6, wherein said program instructions comprise means for associating a delay signal of a predetermined first duration with switching on or off of the associated appliance, and a delay signal of greater than said first duration with a change in intensity of the associated appliance.

9. The system as claimed in claim 1, wherein said control signal generating means comprises a switching circuit having two parts, the first part comprising switch means for turning the current off for any one of a plurality of selected time periods after a positive going zero crossing and the second part comprising switch means for turning the current off for any one of plurality of selected time periods after a negative going zero crossing, each said switch means comprising a switching device for turning off the current after the respective zero crossing and control means for switching on said switching device after the corresponding selected time period, said control means including said manually operable switches, each of said switches comprising a normally open switch, a charging circuit in which said switch is connected having a predetermined time constant corresponding to one of said selected time periods, each of said charging circuits comprising means for delaying operation of said control means for said selected time period on closure of the associated switch.

10. The system as claimed in claim 9, wherein said timing devices each comprise a thyristor connected to one side of an AC power input, and said control means comprise switchable means connected to be fired when said AC input reaches a predetermined positive or negative voltage, respectively, said charging circuits comprising means for delaying firing of said switchable means for the time constant of said respective charging circuits when one of the associated switches is closed.

11. The system as claimed in claim 10, wherein said thyristors are silicon controlled rectifier devices connected in opposite directions to the AC input, and said switchable means comprise two silicon bilateral switches, one connected to the gate of one of the thyristors and the other connected to the gate of the other thyristor.

12. The system as claimed in claim 9, wherein said switching circuit includes power regulating means for providing a constant voltage to the charging circuits.

13. The system as claimed in claim 1, wherein said manually operable switches include a first pair of normally open switches for switching one of said appliances on and off, respectively, and a second pair of normally open switches for switching the other appliances on and off, respectively, and dual function push button means associated with said pair of switches for depression by an operator to close a selected one of said switches, said switches being biassed into an open position on release of the associated push button.

14. The system as claimed in claim 6, wherein said manually operable switches further include a fifth REVERSE switch for reversing the direction of the fan, and a sixth, PROGRAM switch of reinitiating any one of a series of pre-programmed sequences of operation of said system.

15. The system as claimed in claim 14, wherein each of said switches is associated with push button means for depression by an operator to close the associated switch, the switches being biassed to open on release of the associated push button means, and said control functions comprise means for monitoring the duration of control pulses generated by closure of any of said switches, means for switching said light on and off, respectively, in response to closure of said first and second switch for a first duration and for increasing and decreasing the light intensity, respectively, in response to closures of said first and second switch for greater than said first duration.

16. The system as claimed in claim 15, wherein said control functions further comprise means for switching said fan on and off, respectively, in response to closure of said third and fourth switch for a first length of time, and for increasing and decreasing the fan speed, respectively, in response to closure of said third and fourth switch for greater than said first length of time.

17. The system as claimed in claim 14, wherein said control functions further include means for monitoring the length of time said sixth switch is closed, and means for associating a series of different lengths of switch closure times with a series of different programmed sequences of operation.

18. The system as claimed in claim 17, wherein one of said programmed sequences of operations comprises mean for switching said lights on and off repeatedly for different pre-selected time periods.

19. The system as claimed in claim 17, wherein one of said programmed sequences of events comprises means for switching said lights off automatically after a predetermined time period.

20. The system as claimed in claim 1, wherein said delay signal detecting means comprises a digital timing circuit for detecting delays after each zero crossing and producing output control signals having a length dependent on said delays.

21. The system as claimed in claim 20, wherein said timing circuit comprises a first part responsive to the positive half of the AC waveform received from said generating means and a second part responsive to the negative half of the waveform received from said generating means, said first and second parts comprising means for tuning on and off, respectively, in response to the AC half cycle reaching a predetermined voltage level normally reached just after a zero crossing and just before the next zero crossing, respectively, whereby a delayed firing signal will result in a delay in the turn on point and a resultant shortening of the output control pulse.

22. The system as claimed in claim 21, wherein the first part of the timing circuit comprises a first inverter for turning off when the rising part of the positive half of the input AC waveform reaches 10 volts and turning off when the falling part of the positive half reaches 10 volts, and a second inverter connected to invert the output of the first inverter, and the second part of the circuit comprises a third inverter for turning on when the falling part of the negative half of the input AC waveform reaches −10 volts and turning off when the rising part of the negative half reaches −10 volts, the timing circuit further including a pair of flip flops and an OR gate having its inputs connected to the outputs of the flip flops, the output of the OR gate comprising a control pulse input to said programmable control means, one of the flip flops being reset in response to switching on or off of said second inverter and the other of said flip flops being reset in response to switching on or off of said third inverter, and means for clocking the two flip flops comprising an OR gate connected to the outputs of the first and third inverters and having its output connected to the clock inputs of the two flip flops.

23. The system as claimed in claim 1, wherein said manually operable switches and control signal generating means are provided in a wall control unit, and said delay signal generating means and programmable control means are provided in a remote ceiling fixture main control unit connected to the output of said wall control unit, said ceiling fixture comprising a combined ceiling fan and light assembly, and said main control unit further comprising light driver means for controlling opeation of the light, a motor for rotating said fan, motor driver means for switching said motor on and off, speed control means for controlling the speed of said fan, and reversing means for reversing the direction of said fan, said programmable control means comprising means for controlling operation of said light driver, motor driver, speed control means and reversing means in response to detection of any one of a series of predetermined delay signals from said wall control unit.

24. The system as claimed in claim 23, wherein said main control unit further includes a power supply for supplying a regulated DC voltage to DC operated components of said main control unit.

25. The system as claimed in claim 23, wherein said main control unit further includes an audio output device or producing an audio output signal, said programmable means further comprising means for operating said audio output device in response to detection of predetermined delay signals.

26. The system as claimed in claim 23, wherein said control means furhter comprises means for controlling said light driver to delay switching on and off of said light for predetermined time periods after detection of delayed signals corresponding to light on and off control functions.

27. The system as claimed in claim 26, wherein said programmable control means comprises means for gradually increasing the light intensity from zero in response to detection of a lights on control signal, and for decreasing the light intensity in at least two steps on detection of a lights off control signal.

28. A system for separately controlling operation of a ceiling fan and light of a combination ceiling fan and light fixture, comprising:
 a manually operable wall control panel including a series of push keys, the push keys including one each for turning the light on and off and one each for turning the fan on and off,
 a wall control unit including a series of switches each positioned to be actuated by a respective one of said push keys, means for connecting the wall control unit to an AC input current, and means for switching off the positive and negative halves of said AC input current for predetermined time periods in response to actuation of said switches to provide a series of different delay signals on the positive and negative halves of the AC current, each switch being associated with a predetermined positive or negative half delay signal different from all the other switch delay signals,
 a main control unit mounted at the combination ceiling fan and light fixture, comprising detector means for detecting and distinguishing between said delay signals from said wall control unit and for producing corresponding output control signals and microcomputer means responsive to said output control signals for controlling operation of said fan and light.

29. The system as claimed in claim 28, wherein said wall control unit comprises means for producing 30 and 45 degree delay signals, respectively in the positive and negative halves of the AC current, the switches for producing positive and negative 30 degree delay signals being associated with the light control push keys and the switches for producing positive and negative 45 degree delay signals being associated with the fan control push keys.

30. The system as claimed in claim 28, wherein said wall control panel further includes additional push keys for reversing the fan direction and for initiating programmed sequences of operation, said wall control unit further including additional switches responsive to said additional push keys to produce corresponding delay signals different from those produced by the other push keys.

* * * * *